United States Patent [19]

Uffner

[11] 4,394,482

[45] Jul. 19, 1983

[54] MODIFIED ASPHALT COMPOSITION

[75] Inventor: William E. Uffner, Newark, Ohio

[73] Assignee: Owens-Corning Fiberglas Corporation, Toledo, Ohio

[21] Appl. No.: 360,124

[22] Filed: Mar. 22, 1982

Related U.S. Application Data

[63] Continuation of Ser. No. 167,985, Jul. 14, 1980, abandoned.

[51] Int. Cl.$^3$ ............................................... C08L 95/00
[52] U.S. Cl. .................................... 525/54.5; 260/733; 260/745; 260/758; 523/206; 427/389.8; 428/375; 428/378; 428/392; 428/440; 428/489
[58] Field of Search ....................... 260/733, 745, 758; 523/206; 525/54.5; 427/389.8; 428/375, 378, 392, 440, 489

[56] References Cited

U.S. PATENT DOCUMENTS

| | | | |
|---|---|---|---|
| 2,578,001 | 12/1951 | Cubberley et al. | 260/758 |
| 2,610,162 | 9/1952 | Hoffman | 260/27 |
| 2,884,400 | 4/1959 | Moore | 260/33.6 |
| 3,338,849 | 8/1967 | Johnson | 260/4 |
| 3,547,850 | 12/1970 | Montgomery | 260/28.5 |
| 3,932,341 | 1/1976 | Kutch et al. | 260/33.6 |
| 4,008,095 | 2/1977 | Fukushima et al. | 106/235 |
| 4,064,082 | 12/1977 | Henschel | 260/27 EV |
| 4,105,612 | 8/1978 | Cushman et al. | 260/28.5 AV |
| 4,113,799 | 9/1978 | Van Ornum | 260/876 B |
| 4,164,490 | 8/1979 | Hagenbach et al. | 260/33.6 |
| 4,169,822 | 10/1979 | Kutch et al. | 260/27 BB |
| 4,172,061 | 10/1979 | Bresson | 260/28.5 |
| 4,174,992 | 11/1979 | Fujii et al. | 156/244.11 |
| 4,217,259 | 8/1980 | Bresson | 260/28.5 |
| 4,273,685 | 6/1981 | Marzocchi et al. | 260/28.5 AS |

FOREIGN PATENT DOCUMENTS 1557193 2/1969 France.
51-53522 5/1976 Japan.

Primary Examiner—Theodore E. Pertilla
Attorney, Agent, or Firm—Ronald C. Hudgens; Robert F. Rywalski

[57] ABSTRACT

A rubber-modified asphalt composition prepared by blending a terpene resin with the reaction product of (1) a polymerizable aromatic monomer, a rubbery polymer and a bituminous material such as asphalt. The modified asphalt composition of the invention can thus be used in the treatment of glass fibers as well as in road-paving applications, roofing applications and the like.

16 Claims, No Drawings

MODIFIED ASPHALT COMPOSITION

This is a continuation of application Ser. No. 167,985, filed July 14, 1982, now abandoned.

This application relates to copending application Ser. No. 168,901 now abandoned, filed concurrently herewith.

This invention relates to rubber-modified asphalt compositions, and more specifically to asphalt compositions which have been chemically modified to promote compatibility and adhesion between the asphalt and reinforcements employed with the asphalt.

In application Ser. No. 881,108, filed Feb. 24, 1978, now abandoned, and its continuing application Ser. No. 45,047, filed June 4, 1979, now U.S. Pat. No. 4,273,685, there is disclosed as asphalt composition which has been chemically modified with the rubbery polymer to increase fire retardancy and chemical reactivity of the asphalt. The modification of the asphalt with a rubbery polymer also has been found to promote compatibility between the asphalt and reinforcements used with the asphalt, notably glass fibers, glass flake and other organic and inorganic fillers and reinforcements. The chemically-modified asphalts disclosed in these copending applications are prepared by reaction of a bitumen, and preferably asphalt, with a vinyl aromatic monomer such as styrene and a rubbery polymer. It has been postulated that the vinyl aromatic monomer employed as a coreactant is polymerizable with ethylenic unsaturation contained in the bitumen and thus serves to couple, by means of chemical bonds, the asphalt molecules with the rubber polymer. The resulting chemically-modified asphalt can thus be cross linked with the use of a suitable cross-linking agent well known to those skilled in the art. In addition, the rubbery polymer which has been chemically bonded to the asphalt can serve as a source of reaction sites to establish a chemical bond between the chemically-modified asphalt and reinforcing fillers such as glass fibers, siliceous aggregate, glass flake and combinations thereof which are blended with the chemically-modified asphalt in reinforced asphalt systems.

In the preparation of chemically-modified asphalt compositions as is described in the foregoing applications, it was found that the reaction could be caused to take place by simply contacting the rubbery polymer with the vinyl aromatic monomer, and heating the resulting mixture. It was found that, while a catalyst could be used to promote the reaction, the reaction would also proceed in the absence of the catalyst.

The resulting rubber-modified asphalt was found to be substantially free from tackiness and could be used in the treatment of glass fibers for a variety of applications, including road-paving applications, roof repair applications and the like.

One of the difficulties in the use of rubber-modified asphalts as described in the foregoing applications arises from the fact that the rubber-modified compositions are characterized by high viscosities, and thus, for certain applications, are difficult to use, particularly where it is desired to apply the modified asphalt as a coating on fillers or like reinforcements.

In copending application Ser. No. 168,901, filed concurrently herewith, there is described a rubber-modified asphalt composition prepared by reaction of an asphalt with a polymerizable vinyl aromatic monomer, a rubbery polymer and a terpene resin. As described in that copending application, the disclosure of which is incorporated herein by reference, it was found that the incorporation of the terpene resin during the reaction between the polymerizable vinyl aromatic monomer, the rubbery polymer and the asphalt results in the chemical bonding of the terpene resin to the rubber-modified asphalt. That represents a distinct advantage in that the composition is quite tacky, and is thus ideally suited for use as an adhesive.

For some applications, however, it is desirable to control the viscosity of the rubber-modified asphalt without significantly increasing the tack of it. The concepts of the present invention, it has been found, make it possible to reduce the viscosity without significantly increasing the tack of the rubber-modified asphalt.

It is accordingly an object of this invention to provide a chemically-modified asphalt system which overcomes the disadvantages described above.

It is a more specific object of this invention to provide a chemically-modified composition wherein the asphalt molecules are chemically combined with elastomeric material and blended with a resin polymer to control the viscosity of the resulting modified asphalt.

The concepts of this invention reside in a chemically-modified asphalt composition in which a terpene resin is blended with the reaction product of asphalt with (1) a rubbery polymer and (2) a polymerizable vinyl aromatic monomer. It has been found that the blend of the terpene resin with the rubber-modified asphalt serves to control the viscosity of the resulting rubber-modified asphalt composition without significantly increasing its tack.

Without limitation as to theory, it is believed that the vinyl aromatic monomer serves to couple, through chemical bonds, the rubbery polymer to the asphalt by reaction to the ethylenic unsaturation of the asphalt. The terpene resin is compatible with the reaction product and thus serves to reduce the viscosity of the overall rubber-modified asphalt. The resulting composition can have viscosity levels such that it can be used in the coating of various fillers, including glass fibers, glass flake, siliceous aggregate and combinations thereof to provide coated fillers and reinforcement for use as reinforcement of asphalt composites. The modified asphalt of this invention can be used in other coating applications, for example, in the rust-proofing of metals and like uses wherein a high degree of chemical inertness is desired. These modified asphalts exhibit a good wet out when used as fabric coatings and are outstanding coatings for bridge decks.

As the polymerizable vinyl monomer, use is preferably made of a monofunctional vinyl aromatic monomer having a general formula:

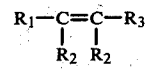

wherein $R_1$ is an aromatic group containing 6 to 12 carbon atoms, including a phenyl group, a substituted phenyl group wherein the substituent is any one of an amino group, a cyano group, a halogen group, a $C_1$ to $C_3$ alkoxy group, a $C_1$ to $C_3$ alkyl group, a hydroxy group, a nitro group, etc. $R_1$ can also be a heterocyclic aromatic group such as a pyridine group, a quinoline group or the like. $R_2$ is preferably hydrogen or lower alkyl e.g. a $C_1$–$C_5$ alkyl such as methyl; and $R_3$ is hydrogen, methyl, or one of the following groups:

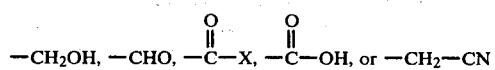

X is halogen, and preferably chlorine or bromine. Illustrative of such vinyl aromatic monomers are styrene, p-aminostyrene, o-methoxystyrene, 2-vinyl pyridine, 3-vinyl quinoline, alpha-methylstyrene, cinnamyl alcohol, cinnamyl aldehyde, cinnamyl chloride and cinnamic acid, etc.

As the rubbery polymer, use can be made of a number of elastomeric materials well known to those skilled in the art. Included are natural rubbers as well as synthetic rubbers. Preferred are synthetic rubbers which are homopolymers of a conjugated diene (e.g., butadiene, isoprene, chloroprene, etc.) as well as various polymers which are substituted with a functional group containing a labile hydrogen atom. For example, various hydroxy, amino and like substituted homopolymers of conjugated dienes may likewise be used in the practice of this invention. Such substituted butadienes are commercially available from, for example, Atlanta-Richfield under the trademark "Poly B-D", a series of hydroxyl-terminated butadiene polymers; for example, use can be made of hydroxy-terminated butadiene homopolymers (e.g., Poly B-D R-15M which has a hydroxy number of 42 or Poly B-D R-45M).

In addition, use can be made, as the rubbery polymers, of elastomeric materials formed by copolymerization of one or more of the conjugated dienes described above with one or more ethylenic monomers such as styrene as well as hydroxy, amino and mercapto-substituted derivatives thereof, acrylonitrile, methacrylonitrile, acrylic acid, methacrylic acid, etc. Included are butadiene-styrene rubbers, butadiene-acrylonitrile rubbers, etc. Hydroxy-terminated copolymers are likewise useful in the practice of this invention, including the hydroxy-terminated butadiene-styrene copolymer designated "Poly B-D CS-15" and hydroxy-terminated butadiene-acrylonitrile copolymers (e.g., Poly B-D CN-15 having a hydroxyl number of 39). Frequently preferred for use in the practice of this invention is the butadiene-styrene rubber marketed by Phillips Petroleum Company under the trade name "Solprene" 1205C.

As the terpene resin, use can be made of a number of synthetic polyterpene resins commercially available. One such resin is marketed by Goodyear Chemicals under the trademark "Wingtack", including the Wingtack 95 resin which is a synthetic polyterpene derived from $C_5$ hydrocarbon resins. Another Wingtack resin useful in the practice of this invention is known as Wingtack 115, a resin chemically similar to Wingtack 95, except that Wingtack 115 has been polymerized to a higher softening point. Another, and frequently preferred terpene resin, are the terpene resins manufactured by Hercules Incorporated under the trademark "Piccolyte" resins, including the A100, A115, A125 and A135 resins, with A115 being preferred. Those resins are all derived from the monomer alpha-pinene. They have melt viscosities ranging from 185° to 220° C. at 1 poise. Another suitable commercially available terpene resin is Nevpene 9500 available from the Nevelle Chemical Company.

In carrying out the reaction of the asphalt with the vinyl aromatic monomer and the rubbery polymer, it has been found that no catalysts are required, although free radical catalysts may be used, if desired. It is sufficient that the mixture of the asphalt, vinyl aromatic monomer and the rubbery polymer be heated to a temperature ranging from 200° to 500° F., and preferably 300° to 360° F., to promote the reaction. As will be appreciated by those skilled in the art, the reaction time is somewhat dependent on the reaction temperature with higher temperatures favoring a more rapid rate of reaction. If desired, the asphalt can be, prior to reaction, dissolved in an inert organic solvent, preferably an aromatic solvent, although the use of the solvent is not necessary. It is generally preferred to carry out the reaction under non-oxidizing conditions to avoid combustion. Use of an inert gas can be made for that purpose.

In accordance with one variation of the practice of this invention, the reaction time for chemically combining the asphalt, the rubbery polymer and the vinyl aromatic monomer can be reduced by utilizing, in conjunction with the vinyl aromatic monomer as described above, a polyfunctional aromatic monomer containing 6 to 12 carbon atoms in the aromatic ring and two or more polymerizable vinyl groups chemically bonded to the aromatic ring. It has been found that the use of a polyfunctional vinyl aromatic monomer combination with the monofunctional vinyl aromatic monomer described above does serve to increase the reaction time necessary to chemically combine the asphalt and the rubbery polymer.

Preferred polyfunctional monomers are those having the general formula:

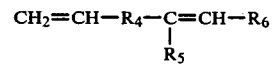

wherein $R_4$ is a divalent aromatic group containing 6 to 12 carbon atoms, and preferably a phenylene group; and, $R_5$ and $R_6$ have the same meaning as is described above with respect to $R_2$ and $R_3$, respectively. Illustrative of suitable polyfunctional vinyl aromatic monomers are divinyl benzene, and the cinnamyl styrenes described above.

The proportions employed in the practice of this invention can be varied within wide limits. Generally, the vinyl aromatic monomer is used in an amount ranging from 0.5 to 40% by weight based on the weight of the asphalt, while the rubbery polymer is employed in an amount ranging from 0.5 to 35% by weight based on the weight of the asphalt. The terpene resin employed can be used in amounts as determined by the degree of tackiness desired in the vinyl composition. In general, good results are achieved when the terpene resin is present in an amount ranging from 5 to 80% by weight based on the weight of the modified asphalt.

When use is made of a polyfunctional vinyl aromatic monomer in combination with a monofunctional vinyl aromatic monomer such as styrene, generally the monofunctional is present in a weight ratio of about 1:1–40:1 based on the weight of the polyfunctional vinyl aromatic monomer.

In carrying out the reaction used to produce rubber-modified asphalts of this invention, use can be made of ordinary asphalt or asphalt which has been modified by reaction with air (e.g., blown asphalt) or steam.

When used in the coating or impregnation of glass fibers or bundles of glass fibers, respectively, use can be made of asphalt compositions of this invention in amounts over relatively wide ranges. Generally, the coating or impregnant is applied in an amount sufficient to constitute from 0.1 to about 50% by weight, or even higher, of the weight of the glass fibers.

It has been found, in accordance with the practice of this invention that, when employing asphalt compositions of this invention to coat glass fibers, either as a thin film coating on the individual glass fiber filaments or as an impregnant in bundles of glass fibers, it is desirable to heat the asphalt after it has been applied to the glass fiber surfaces. That optional heat treatment step serves to set the asphalt coating on the glass fiber surfaces, and, at the same time, to insolubilize by further cross linking the asphalt thereon. The heating step has been found to increase the wet strength of the asphalt-treated glass fibers significantly.

In carrying out the optional heating step as described above, it is sufficient that the asphalt-treated glass fibers be heated to a temperature ranging from 200°-500° F., depending somewhat on the softening point of the asphalt involved.

Having described the basic concepts of the present invention, reference is now made to the following examples, which are provided by way of illustration and not by way of limitation, of the practice of this invention in the preparation of chemically-modified asphalts and their use.

EXAMPLE 1

A chemically-modified asphalt is prepared by heating the following reaction mixture to a temperature of 380° F. for 24 hours:

|  | Parts by Weight |
|---|---|
| Asphalt | 700 |
| Styrene | 75 |
| Butadiene-Styrene rubber | 125 |

40 parts by weight of the foregoing modified asphalt is heated to a temperature within the range of 350°-380° F. and then the terpene resin Wingtack 95 is added in an amount of 10 parts by weight. In a separate experiment 10 parts by weight of Wingtack 115 is substituted for Wingtack 95. Blending of the terpene resins is accomplished while the mixture is still hot, and the viscosity (at 380° F.) determinations are set forth below:

| Chemically-modified asphalt without terpene resin | Viscosity 1096 cps |
|---|---|
| Chemically-modified asphalt with Wingtack 95 | 645 cps |
| Chemically-modified asphalt with Wingtack 115 | 618 cps |

The softening point of chemically-modified asphalt blended with the terpene resin was the same as that for the chemically-modified asphalt prior to blending with the terpene resin.

EXAMPLE 2

A rubber-modified asphalt as described in Example 1 is blended with a terpene resin (Nevpene 9500) from Nevelle Chemical Company in proportions such that the terpene resin amounts to 20% by weight of the chemically-modified asphalt. The softening point of the asphalt remains substantially the same, whereas the viscosity is markedly reduced.

It will be understood that various changes and modifications can be made in the details of procedure, formulation and use without departing from the spirit of the invention, especially as defined in the following claims.

I claim:

1. A chemically modified asphalt composition comprising (1) an asphalt which has been reacted with a polymerizable vinyl aromatic monomer and a rubbery polymer and (2) a terpene resin, said terpene resin being present in an amount sufficient to reduce the viscosity of said reacted asphalt.

2. A chemically-modified asphalt composition as defined in claim 1 wherein the rubber polymer is selected from the group consisting of homopolymers of a conjugated diene and copolymers formed of a conjugated diene and at least one ethylenic monomer copolymerizable therewith.

3. A chemically-modified asphalt composition as defined in claim 2 wherein the ethylenic monomer is selected from the group consisting of styrene, acrylonitrile, methacrylonitrile, acrylic acid, methacrylic acid, hydroxy-styrene, aminostyrene and mercaptostyrene.

4. A chemically-modified asphalt as defined in claim 1 wherein the asphalt to be reacted is an asphalt which has been prereacted with a modifying agent selected from the group consisting of steam and an oxygen-containing gas.

5. A chemically-modified asphalt as defined in claim 1 wherein the vinyl aromatic monomer is styrene.

6. A chemically-modified asphalt as defined in claim 1 wherein the terpene resin is a resin derived from α-pinene.

7. A chemically-modified asphalt as defined in claim 1 wherein the vinyl aromatic monomer used in the reaction is an amount within the range of 0.5 to 40% by weight based on the weight of the asphalt.

8. A chemically-modified asphalt as defined in claim 1 wherein the rubbery polymer is reacted in an amount ranging from 0.5 to 35% by weight based on the weight of the asphalt.

9. A chemically-modified asphalt as defined in claim 1 wherein the vinyl aromatic monomer has the formula:

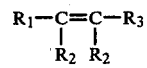

wherein $R_1$ is an aromatic group containing 6 to 12 carbon atoms, $R_2$ is hydrogen or lower alkyl and $R_3$ is selected from the group consisting of H, -CH$_3$, -CH$_2$OH, -CHO,

wherein X is halogen,

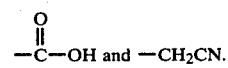

10. A chemically-modified asphalt as defined in claim 1 wherein the reaction is carried out in the presence of a polyfunctional vinyl aromatic monomer.

11. A chemically-modified asphalt as defined in claim 10 wherein the polyfunctional monomer has the formula:

$$CH_2=CH-R_4-\underset{\underset{R_5}{|}}{C}=CH-R_6$$

wherein $R_4$ is a divalent aromatic group containing 6 to 12 carbon atoms, $R_5$ is H or a lower alkyl and $R_6$ is selected from the group consisting of H, -CH$_3$, -CH$_2$OH, -CHO, $$-\overset{\overset{O}{\|}}{C}-X$$

wherein X is halogen, $$-\overset{\overset{O}{\|}}{C}-OH \text{ and } -CH_2CN.$$

12. A chemically-modified asphalt as defined in claim 1 wherein the terpene resin is present in an amount sufficient to reduce the viscosity of the asphalt.

13. Glass fibers having a coating thereon, said coating comprising a chemically-modified asphalt as defined in claim 1.

14. Glass fibers as defined in claim 13 wherein the glass fibers are in the form of a bundle and the coating constituents an impregnant in the bundle.

15. In a glass fiber reinforced asphalt wherein as asphalt constitutes a continuous phase in which the glass fibers are distributed as reinforcement, the improvement comprising, as the continuous phase, a chemically-modified asphalt as defined in claim 1.

16. In a glass fiber reinforced asphalt wherein an asphalt constitutes a continuous phase in which glass fibers, having a coating thereon, are distributed through the continuous phase as reinforcement, the improvement comprising glass fibers which have been coated with a chemically-modified asphalt as defined in claim 1.

* * * * *